United States Patent
Park et al.

(10) Patent No.: US 9,573,468 B2
(45) Date of Patent: Feb. 21, 2017

(54) AUDIO/VIDEO PROCESSING APPARATUS FOR A CAR

(71) Applicant: GM Global Technology Operations LLC, Detroit, MI (US)

(72) Inventors: Jin Chul Park, Incheon (KR); Jong Uk Park, Incheon (KR); Sang Hoon Park, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/226,449

(22) Filed: Mar. 26, 2014

(65) Prior Publication Data
US 2014/0297064 A1   Oct. 2, 2014

(30) Foreign Application Priority Data

Mar. 28, 2013  (KR) ........................ 10-2013-0033523

(51) Int. Cl.
| | | |
|---|---|---|
| *B60K 35/00* | (2006.01) | |
| *H04N 21/414* | (2011.01) | |
| *H04N 21/422* | (2011.01) | |
| *H04N 21/81* | (2011.01) | |

(52) U.S. Cl.
CPC ......... *B60K 35/00* (2013.01); *H04N 21/41422* (2013.01); *H04N 21/4222* (2013.01); *H04N 21/8166* (2013.01); *B60K 2350/106* (2013.01)

(58) Field of Classification Search
CPC .................... H04N 21/8166; H04N 21/41422; B60K 2350/106; B60K 35/00
See application file for complete search history.

(56) References Cited

U.S. PATENT DOCUMENTS

| | | | |
|---|---|---|---|
| 2008/0007120 A1* | 1/2008 | Weyl | .......................... G06F 8/60 307/10.1 |
| 2012/0077477 A1 | 3/2012 | Oh | |
| 2012/0088549 A1 | 4/2012 | Yun et al. | |
| 2012/0110625 A1 | 5/2012 | Bae et al. | |
| 2013/0194163 A1* | 8/2013 | Oh | ................. 345/2.3 |
| 2014/0189528 A1* | 7/2014 | Chang | ................. H04M 1/6075 715/752 |

FOREIGN PATENT DOCUMENTS

KR     10-2012-115827     10/2012

OTHER PUBLICATIONS

"2014 Chevrolet Impala MyLink Infotainment System", Mar. 11, 2013 (Mar. 11, 2013), XP055125711, www.chevrolet.com.
Vauxhall: "The IntelliLink System Overview / Vauxhall ADAM", Mar. 12, 2013 (Mar. 12, 2013), p. 1 pp. XP054976467, Retrieved from the internet: URL:https://www.youtube.com/watch?v=uNseULDevWw [retrieved on Apr. 13, 2016].

* cited by examiner

Primary Examiner — Basil T Jos
(74) Attorney, Agent, or Firm — Head, Johnson & Kachigian, P.C.

(57) ABSTRACT

The disclosure is related to an audio/video processing apparatus for a car such as a car audio system, which allows various applications installed at a mobile communication device of a user (for example, a smart phone, a tablet PC or the like) to be implemented using car equipment, by executing or implementing various applications installed at a mobile communication device through a car audio/video control module or an application for a car (App-C) installed at the car.

3 Claims, 6 Drawing Sheets

AUDIO/VIDEO PROCESSING APPARATUS FOR A CAR

CROSS-REFERENCE TO RELATED APPLICATION

This application claims priority to Korean Patent Application No. 10-2013-0033523, filed on Mar. 28, 2013, and all the benefits accruing therefrom under 35 U.S.C. §119, the contents of which in its entirety are herein incorporated by reference.

BACKGROUND OF THE INVENTION

1. Field of the Invention

The present disclosure relates to an audio/video processing apparatus for a car, for example a car audio system, and more particularly, to an audio/video processing apparatus for a car, which allows various applications installed at a mobile communication device of a user (for example, a smart phone, a tablet PC or the like) to be implemented using car equipment, by executing or implementing various applications (for example, radio listening applications, game applications, news delivery applications, weather report applications, music appreciation applications, movie appreciation applications or the like) installed at a mobile communication device of a user (for example, a smart phone, a tablet PC or the like) through a car audio/video control module or an application for a car (App-C) installed at the car.

2. Description of the Related Art

Recently, along with rapid development of electrics/electronics-related technologies, an audio/video processing apparatus for a car (for example, a car audio system or the like) with better good quality is also rapidly developed. Accordingly, the importance of various back-up techniques capable of effectively reinforcing or supporting the function of an audio/video processing apparatus for a car is gradually increasing.

As a back-up technique in relation to such a general audio/video processing apparatus for a car, for example, Korean Unexamined Patent Publication No. 10-2012-115827 (entitled "an AVN system interworking with a smart phone) (published on Oct. 19, 2012) discloses a method for reducing manufacture costs of a vehicle AVN system by designing the AVN system to use a display of a smart phone.

However, existing techniques such as Korean Unexamined Patent Publication No. 10-2012-115827 just disclose a method for simply connecting an audio/video processing apparatus for a car to a mobile communication device (for example, a smart phone, a tablet PC or the like) (or, a basic-level technique for displaying a navigation screen of an AVN system through a smart phone), and fail to teach a method for associating various applications (for example, radio listening applications, game applications, news delivery applications, weather report applications, music appreciation applications, movie appreciation applications or the like) installed at a mobile communication device of a user (for example, a smart phone, a tablet PC or the like) with an audio/video processing apparatus for a car. Therefore, even though a user desires to implement various applications installed at a mobile communication device of a user (for example, a smart phone, a tablet PC or the like) through an audio/video processing apparatus for a car, the corresponding service is not available.

RELATED LITERATURES

Patent Literature

Korean Unexamined Patent Publication No. 10-2012-115827 (entitled "an AVN system interworking with a smart phone) (published on Oct. 19, 2012)

BRIEF SUMMARY OF THE INVENTION

The present disclosure is directed to implementing various applications installed at a mobile communication device of a user (for example, a smart phone, a tablet PC or the like) through an audio/video processing apparatus for a car, by executing or implementing various applications (for example, radio listening applications, game applications, news delivery applications, weather report applications, music appreciation applications, movie appreciation applications or the like) installed at a mobile communication device of a user (for example, a smart phone, a tablet PC or the like) through a car audio/video control module or an application for a car (App-C).

Other objects will be more clearly understood from the following detailed description and the accompanying drawings.

In one aspect, there is provided an audio/video processing apparatus for a car, which includes a car audio/video control module, a sound output speaker and a image output window and communicates through a wire/wireless on-line network with a mobile communication device at which an application for a mobile communication device (App-M) is installed, the audio/video processing apparatus further including: an application for a car (App-C) for generating a function-execution necessary data list and a communication-available protocol code when a user function executing instruction message is transmitted from the car audio/video control module; an App-C message processing module for communicating with the App-C to receive the function-execution necessary data list and the communication-available protocol code, and generating a function-execution necessary data transmission request message containing the function-execution necessary data list, the communication-available protocol code, an App-C name and a corresponding App-M name; an App-M communication module for communicating with the App-C message processing module to receive the function-execution necessary data transmission request message, communicating with the mobile communication device according to the communication-available protocol code and the corresponding App-M name contained in the function-execution necessary data transmission request message to transmit the function-execution necessary data transmission request message to an App-M corresponding to the App-C, and receiving function-execution necessary data corresponding to the function-execution necessary data transmission request message from the App-M corresponding to the App-C; and a function-execution necessary data processing module for communicating with the App-M communication module to receive the function-execution necessary data, transmitting the function-execution necessary data to the App-C or the car audio/video control module so that the function-execution necessary data is output through the sound output speaker or the image output window.

According to embodiments of the present disclosure, various applications (for example, radio listening applications, game applications, news delivery applications, weather report applications, music appreciation applications, movie appreciation applications or the like) installed at a mobile communication device (for example, a smart phone, a tablet PC or the like) may be conveniently executed or implemented using an audio/video processing apparatus for a car, which includes a car audio/video control module, a sound output speaker, a image output window or the like and communicates with the mobile communication device, at which an App-M (an application for a mobile communication device) is installed, through a wire/wireless on-line network.

Therefore, a user possessing a mobile communication device (for example, a smart phone, a tablet PC or the like) may utilize the audio/video processing apparatus for a car in more various ways, and the entire use efficiency of the audio/video processing apparatus for a car may be maximized.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF THE INVENTION

Hereinafter an audio/video processing apparatus for a car according to the present disclosure will be described in detail with reference to the accompanying drawings.

Figure 1:
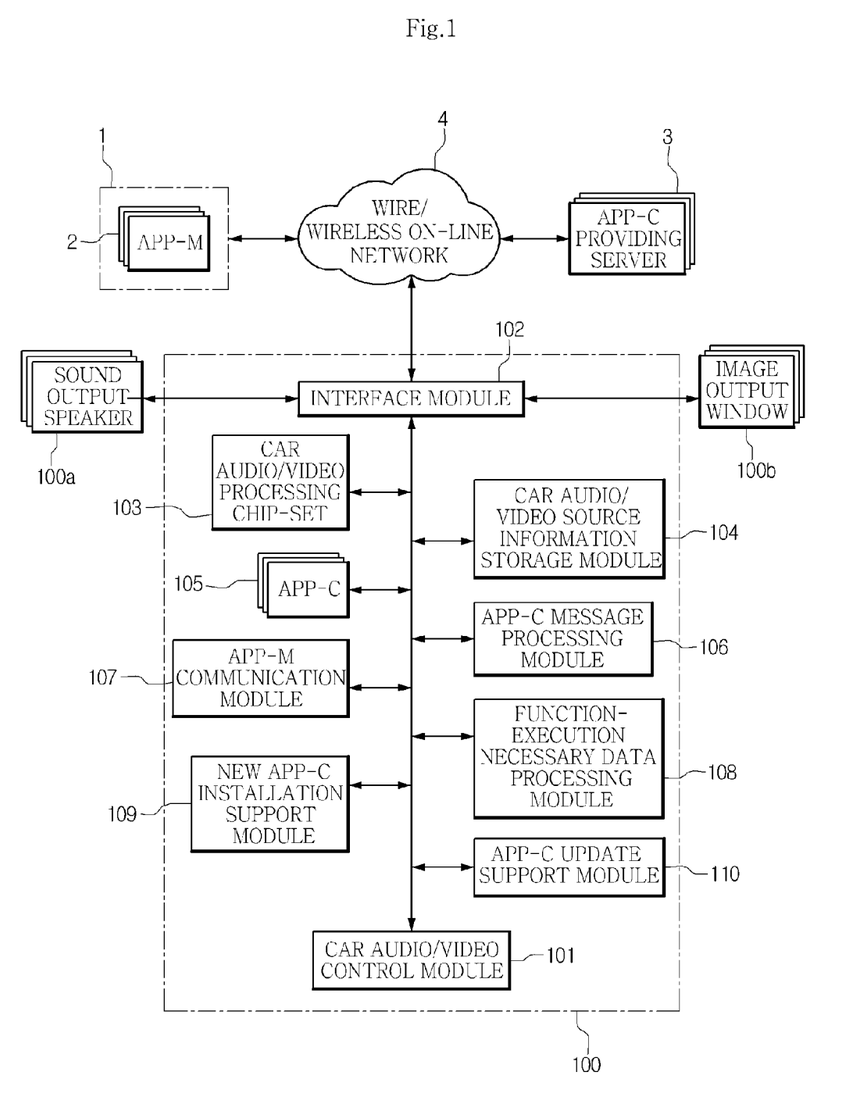
FIG. 1 is a schematic diagram showing a detailed configuration of an audio/video processing apparatus for a car according to the present disclosure.

As shown in FIG. 1, the audio/video processing apparatus 100 for a car according to the present disclosure includes a sound output speaker 100a for outputting sound, a image output window 100b for outputting images or the like. The audio/video processing apparatus 100 for a car communicates with a mobile communication device 1 (for example, a smart phone, a tablet PC or the like) and an App-C providing server 3 through an interface module 102, a wire/wireless on-line network 4 or the like. In addition, the audio/video processing apparatus 100 for a car includes a car audio/video control module 101, a car audio/video processing chip-set 103, a car audio/video source information storage module 104, an App-C 105, an App-C message processing module 106, an App-M communication module 107, a function-execution necessary data processing module 108, a new App-C installation support module 109, an App-C update support module 110 or the like in its program block or hardware block, so that they are communicatively connected to each other.

At this time, the App-C providing server 3 is communicatively connected to the audio/video processing apparatus 100 for a car according to the present disclosure via the interface module 102 and the wire/wireless on-line network 4 and provides various App-C 105 (for example, App-C capable of supporting radio listening, App-C capable of supporting game play, App-C capable of providing news information, App-C capable of providing weather information, App-C capable of supporting music appreciation, App-C capable of supporting movie appreciation, or the like), to the audio/video processing apparatus 100 for a car as requested by the audio/video processing apparatus 100 for a car. The mobile communication device 1 provides various execution bases for App-M 2 (for example, radio listening applications, game applications, news delivery applications, weather report applications, music appreciation applications, movie appreciation applications or the like) installed in its program block.

In addition, the car audio/video control module 101 installed in the program block of the audio/video processing apparatus 100 for a car controls the car audio/video processing chip-set 103 based on various audio/video source information (for example, sound source information, font information, graphic information, template information, program information, setting information or the like) stored in the car audio/video source information storage module 104 and also supports functions required for the audio/video processing apparatus 100 for a car, for example, a car audio function, a car navigation function or the like, to be performed normally.

Figure 3:
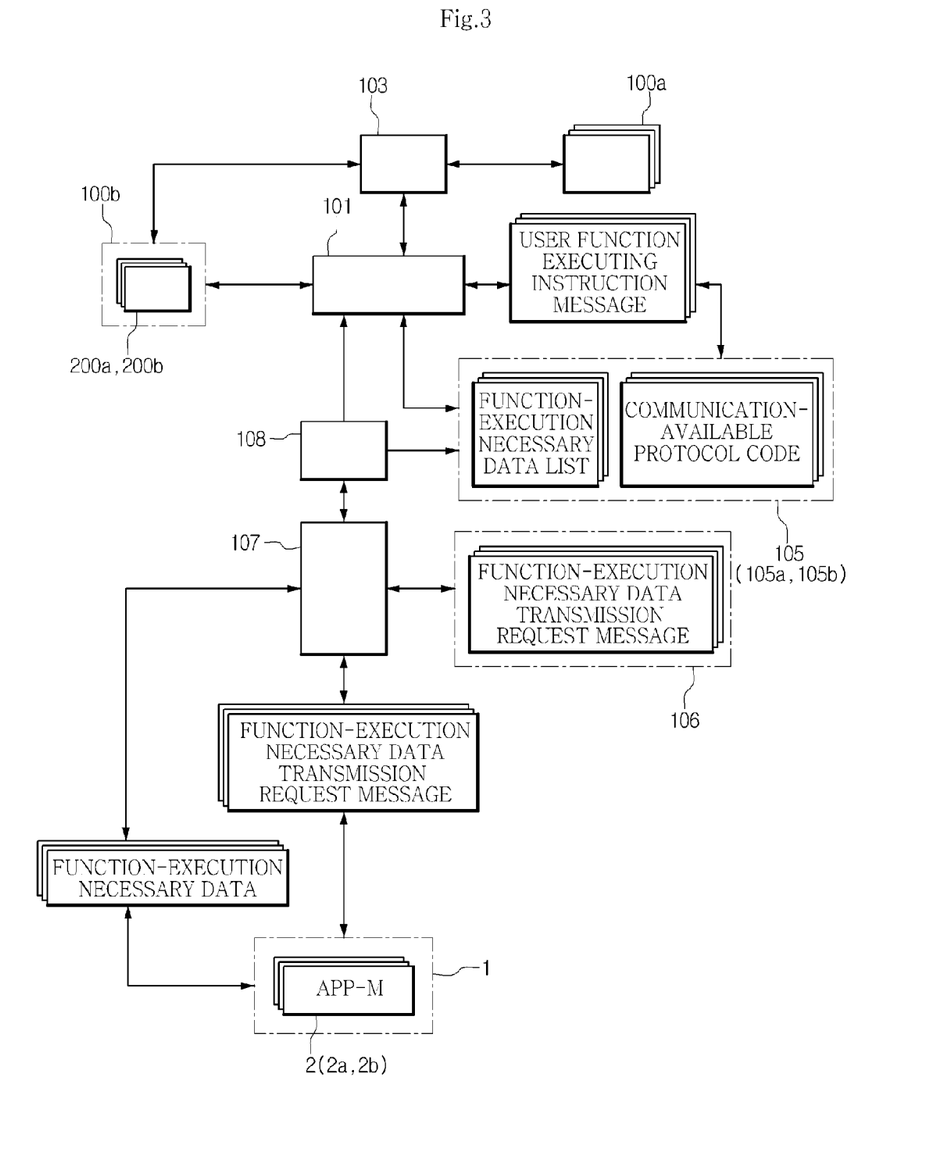
FIG. 3 is a schematic diagram showing a detailed function performing procedure of the audio/video processing apparatus for a car according to the present disclosure.

In an embodiment, the App-C 105 installed in the program block of the audio/video processing apparatus 100 for a car has a function corresponding to the App-M 2 installed at the mobile communication device 1. For example, as shown in FIG. 3 described later, an App-C 105b for supporting game play has a function corresponding to a game application 2b installed at the mobile communication device 1, and an App-C 105a for providing news information has a function corresponding to a news delivery application 2a installed at the mobile communication device 1.

In this case, the App-C 105 logically or functionally connects various App-M 2 installed at the mobile communication device 1 to the car audio/video control module 101, and if function-execution necessary data is transmitted from the App-M 2 installed at the mobile communication device 1, the App-C 105 outputs or implements the transmitted function-execution necessary data through the sound output speaker 100a or the image output window 100b in cooperation with the car audio/video control module 101.

Here, the function-execution necessary data means data demanded for the App-C 105 to actually implement a necessary function. For example, the function-execution necessary data may be data required for radio listening, data required for game play, data required for providing news information, data required for providing weather information, data required for supporting music appreciation, data required for supporting movie appreciation, or the like.

Figure 2:
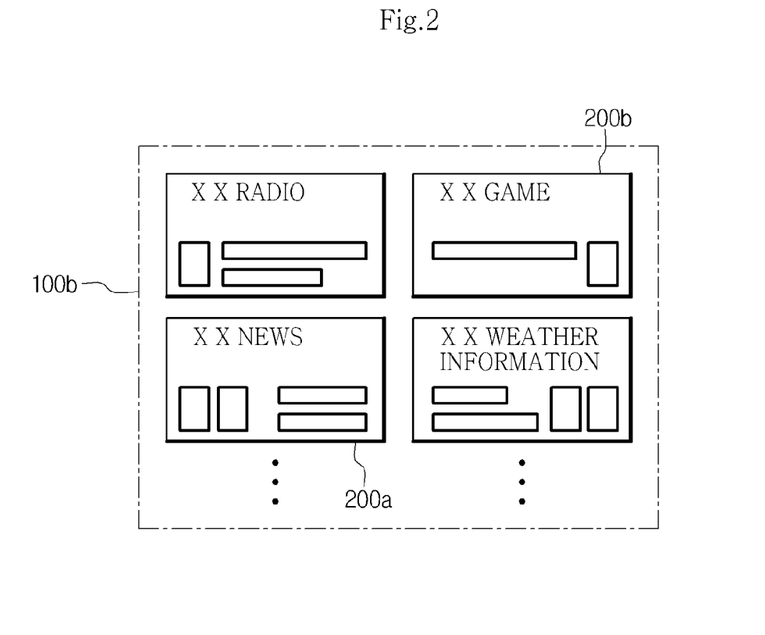
FIG. 2 is a schematic diagram showing a posting form of an App-C selection-inducing indicator through a image output window according to the present disclosure.

In this configuration, the car audio/video control module 101 communicates with the App-C 105, the car audio/video source information storage module 104 or the like to post or operate App-C selection-inducing indicators 200a, 200b through the image output window 100b as shown in FIG. 2 (however, the posting form of the App-C selection-inducing indicators 200a, 200b may be modified in various ways into a list form, an icon form, a preview image form or the like as necessary).

In addition, if specific App-C selection-inducing indicators 200a, 200b are selected by a user or the like, the car audio/video control module 101 calls an App-C 105 connected to the selected App-C selection-inducing indicators 200a, 200b, and transmits a user function executing instruction message (for example, a radio executing instruction message, a game executing instruction message, a news information delivery instruction message, a weather information providing instruction message, a music executing instruction message, a movie executing instruction message, or the like) to the called App-C 105.

For example, in FIGS. 2 and 3, it is assumed that a user selects a specific App-C selection-inducing indicator 200b associated with game play. In this case, the car audio/video control module 101 calls an <App-C 105b capable of supporting game play> associated with the selected App-C selection-inducing indicator 200b, and then transmits a game executing instruction message to the called <App-C 105a capable of supporting game play>.

In another example, it is assumed that a user selects a specific App-C selection-inducing indicator 200a associated with new delivery. In this case, the car audio/video control module 101 calls an <App-C 105a capable of supporting news information delivery> associated with the selected App-C selection-inducing indicator 200b, and then transmits a news information delivery instruction message to the called <App-C 105a capable of supporting news information delivery>.

Meanwhile, as shown in FIG. 3, the App-C 105 may communicate with the car audio/video control module 101 to check whether a user function executing instruction message is transmitted from the car audio/video control module 101.

At this time, if a user function executing instruction message is transmitted from the car audio/video control module 101, the App-C 105 instantly executes a data generation routine to generate a function-execution necessary data list for implementing a necessary function (for example, a data list required for radio listening, a data list required for game play, a data list required for news information delivery, a data list required for providing weather information, a data list required for supporting music appreciation, a data list required for supporting movie appreciation, or the like) and a communication-available protocol code capable of communicating with the App-C 105 (for example, a bluetooth protocol code having an A-type stack, a bluetooth protocol code having a B-type stack, or the like).

For example, if a game executing instruction message is transmitted from the car audio/video control module 101, the <App-C 105b capable of supporting game play> instantly executes a data generation routine to generate the <data list required for game play> and the <bluetooth protocol code having an A-type stack capable of communicating with the App-C 105b>. In another example, if a news information delivery instruction message is transmitted from the car audio/video control module 101, the <App-C 105a capable of supporting news information delivery> instantly executes a data generation routine to generate the <data list required for news information delivery> and the <bluetooth protocol code having a B-type stack capable of communicating with the App-C 105b> (see FIG. 3).

If the App-C 105 completely generates the <function-execution necessary data list> and the <communication-available protocol code>, the App-C message processing module 106 communicates with the App-C 105 to receive the function-execution necessary data list and the communication-available protocol code (see FIG. 3).

In addition, after the function-execution necessary data list and the communication-available protocol code generated by the App-C 105 are transmitted, the App-C message processing module 106 generates a function-execution necessary data transmission request message containing the function-execution necessary data list, the communication-available protocol code, an App-C name and a corresponding App-M name through a data generation routine (see FIG. 3).

For example, if the App-C 105 transmitting the function-execution necessary data list and the communication-available protocol code is the <App-C 105b capable of supporting game play>, the App-C message processing module 106 generates a function-execution necessary data transmission request message containing <a data list required for game play, a bluetooth protocol code having an A-type stack, a game executing App-C, a game application 2b> or the like through a data generation routine. In another example, if the App-C 105 providing the function-execution necessary data list and the communication-available protocol code is the <App-C 105a capable of supporting news information delivery>, the App-C message processing module 106 generates function-execution necessary data transmission request message containing <a data list required for news information delivery, a bluetooth protocol code having a B-type stack, a news information delivery App-C, a news delivery application 2a> or the like through a data generation routine.

If the function-execution necessary data transmission request message is generated by the above process, the App-M communication module 107 communicates with the App-C message processing module 106 to receive the function-execution necessary data transmission request message (see FIG. 3).

In addition, after receiving the function-execution necessary data transmission request message, the App-M communication module 107 reads the received function-execution necessary data transmission request message and checks the communication-available protocol code and the corresponding App-M name contained therein. In addition, according to the checking result, the App-M communication module 107 communicates with the mobile communication device 1 through the interface module 102, the wire/wireless on-line network 4 (for example, a wireless bluetooth network) or the like to transmit the function-execution necessary data transmission request message to an App-M 2 corresponding to the App-C 105 (FIG. 3).

Figure 4:
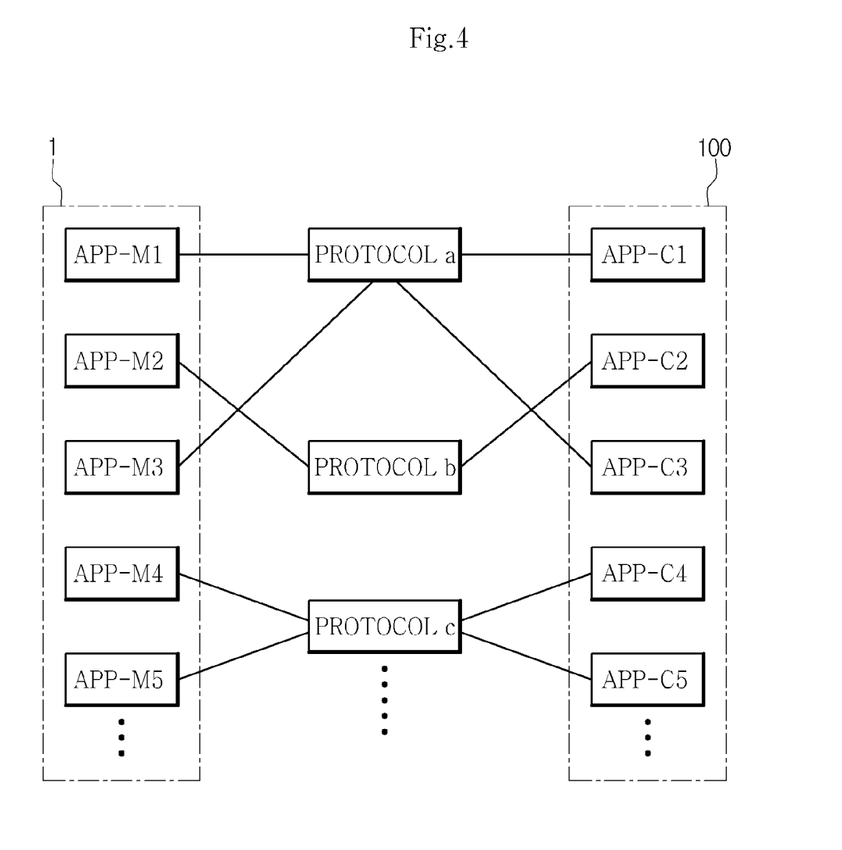
FIG. 4 is a schematic diagram showing communication connection situations of an App-M and an App-C according to the present disclosure.

In this way, for example, the function-execution necessary data transmission request message containing <the data list required for game play, the bluetooth protocol code having an A-type stack, the game executing App-C, the game application 2b> or the like associated with the <App-C 105b capable of supporting game play> is transmitted to the mobile communication device 1 through a protocol network as shown in FIG. 4. In another example, the function-execution necessary data transmission request message containing <the data list required for news information delivery, the bluetooth protocol code having a B-type stack, the news information delivery App-C, the news delivery application 2a> or the like associated with the <App-C 105a capable of supporting news information delivery> is also transmitted to the news delivery application 2a of the mobile communication device 1 through the protocol network as shown in FIG. 4.

Meanwhile, after a function-execution necessary data transmission request message is transmitted to the App-M 2 corresponding to the App-C 105, the App-M communication module 107 communicates with the mobile communication device 1 via the interface module 102, the wire/wireless on-line network 4 (for example, a wireless bluetooth network) or the like to check whether function-execution necessary data corresponding to the function-execution necessary data transmission request message is transmitted from the App-M 2 corresponding to the App-C 105 (see FIG. 3).

At this time, if the function-execution necessary data corresponding to the function-execution necessary data transmission request message is transmitted from the App-M 2 corresponding to the App-C 105, the App-M communication module 107 receives the corresponding function-execution necessary data and transmits the received function-execution necessary data to the function-execution necessary data processing module 108 (see FIG. 3).

If function-execution necessary data is transmitted, received or delivered from the App-M 2 corresponding to the App-C 105 as described above, the function-execution necessary data processing module 108 communicates with the App-M communication module 107 to read contents of the transmitted function-execution necessary data, and transmits the function-execution necessary data to an appropriate App-C 105 or the car audio/video control module 101 according to the read result.

According to the function-execution necessary data processing module 108 configured as above, after receiving function-execution necessary data from various App-M 2 installed at the mobile communication device 1, the App-C 105 may actually output or implement the function-execution necessary data through the sound output speaker 100a, the image output window 100b or the like without any difficulty in cooperation with the car audio/video control module 101 (see FIG. 3).

Therefore, according to the present disclosure, a user may easily execute (for example, radio listening applications, game applications, news delivery applications, weather report applications, music appreciation applications, movie appreciation applications or the like) installed at a mobile communication device (for example, a smart phone, a tablet PC or the like) through the audio/video processing apparatus 100 for a car. Therefore, the user possessing a mobile communication device may utilize the audio/video processing apparatus for a car in more various ways, and the entire use efficiency of the audio/video processing apparatus for a car may be maximized.

In an embodiment, as shown in FIG. 1, a new App-C installation support module 109, an App-C update support module 110 or the like may be additionally disposed in the audio/video processing apparatus 100 for a car according to the present disclosure.

Figure 5:
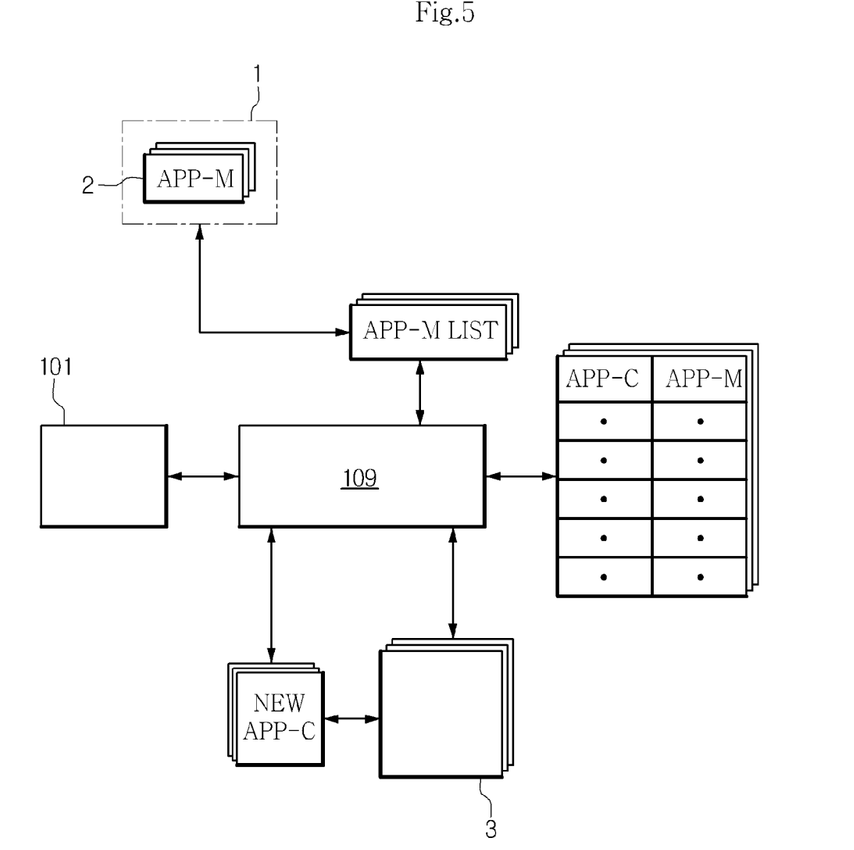
FIG. 5 is a schematic diagram showing a detailed function performing procedure of a new App-C installation support module according to the present disclosure.

At this time, the new App-C installation support module 109 associated with every computing module described above communicates with the mobile communication device 1 via the interface module 102, the wire/wireless on-line network 4 or the like as shown in FIG. 5, and after frequently receiving an App-M list installed at the corresponding mobile communication device 1, the new App-C installation support module 109 compares the received App-M list with a stored App-M list corresponding to the App-C.

If it is checked that the new App-M is present in the App-M list according to the comparison result, the new App-C installation support module 109 communicates with the App-C providing server 3 via the interface module 102, the wire/wireless on-line network 4 or the like to receive a new App-C corresponding to the new App-M. In addition, the new App-C installation support module 109 communicates with the car audio/video control module 101 so that the received new App-C is installed in a program block of the audio/video processing apparatus 100 for a car. Accordingly, a user may easily avoid any service failure caused by mismatching of App-M and App-C.

Figure 6:
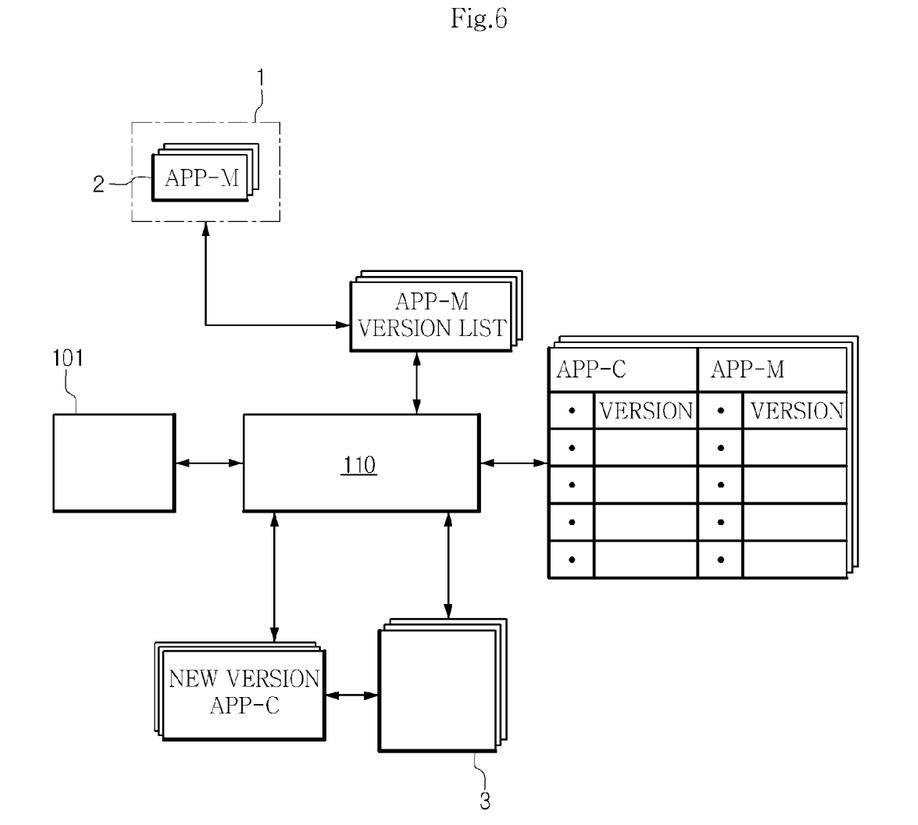
FIG. 6 is a schematic diagram showing a detailed function performing procedure of an App-C update support module according to the present disclosure.

In addition, the App-C update support module 110 associated with every computing module described above communicates with the mobile communication device 1 via the interface module 102, the wire/wireless on-line network 4 or the like as shown in FIG. 6 to frequently receive a version list of the App-M 2 installed at the corresponding mobile communication device 1, and then compares the received version list of the App-M 2 with a stored version list of App-C 105 corresponding to the App-M 2.

If it is checked that a specific App-C 105 needs version-up according to the comparison result, the App-C update support module 110 communicates with the App-C providing server 3 via the interface module 102, the wire/wireless on-line network 4 or the like to receive an App-C of a new version. In addition, the App-C update support module 110 communicates with the car audio/video control module 101 so that the App-C of a new version is installed in a program block of the audio/video processing apparatus 100 for a car. Accordingly, an App-C of an old version is updated to the App-C of a new version, and a user may avoid any service failure caused by mismatching of the App-M 2 and the App-C 105.

Meanwhile, the principle and spirit of the present disclosure described above is not limited to a specific field but may be generally applied to various devices which requires audio/video service.

In addition, even though the present disclosure has been described and illustrated with reference to specific embodiments, it is obvious to those having ordinary skill in the art that the present disclosure may be changed or modified in various ways without departing from the scope thereof.

Therefore, the embodiments disclosed herein are just for better understanding of the present disclosure and are not intended to limit the present disclosure, and the scope of the present disclosure is defined by the appended claims.

What is claimed is:

1. An audio/video processing apparatus for a car, which includes a car audio/video control module, a car audio/video source information storage module, a sound output speaker and a image output window and communicates through a wire/wireless on-line network with a mobile communication device at which an application for a mobile communication device (App-M) is installed, the audio/video processing apparatus comprising:

an application for a car (App-C) for generating a function-execution necessary data list and a communication-available protocol code when a user function executing instruction message is transmitted from the car audio/video control module;

an App-C message processing module for communicating with the App-C to receive the function-execution necessary data list and the communication-available protocol code, and generating a function-execution necessary data transmission request message containing the function-execution necessary data list, the communication-available protocol code, an App-C name and a corresponding App-M name;

an App-M communication module for communicating with the App-C message processing module to receive the function-execution necessary data transmission request message, communicating with the mobile communication device according to the communication-available protocol code and the corresponding App-M name contained in the function-execution necessary data transmission request message to transmit the function-execution necessary data transmission request message to an App-M corresponding to the App-C referring to an App-M list corresponding to the App-C, and receiving function-execution necessary data corresponding to the function-execution necessary data transmission request message from the App-M corresponding to the App-C; and a function-execution necessary data processing module for communicating with the App-M communication module to receive the function-execution necessary data, transmitting the function-execution necessary data to the App-C or the car audio/video control module so that the function-execution necessary data is output through the sound output speaker or the image output window, wherein, the App-C has a function corresponding to the App-M, and the function-execution necessary data is data demanded for the App-C to implement a necessary function, the function-execution necessary data comprises at least one of radio listening data, game play data, news information data, weather information data, music appreciation data, and movie appreciation data, the App-M list corresponding to the App-C are stored in the car audio/video source information storage module.

2. The audio/video processing apparatus for a car according to claim 1, further comprising a new App-C installation support module for communicating with the mobile communication device to receive an App-M list installed at the mobile communication device, comparing the received App-M list with a stored App-M list corresponding to the App-C, wherein if there is a new App-M in the App-M list, the new App-C installation support module communicates with an App-C providing server accessing the wire/wireless on-line network to receive a new App-C corresponding to the new App-M, wherein the new App-C installation support module communicates with the car audio/video control module to install the received the new App-C.

3. The audio/video processing apparatus for a car according to claim 1, further comprising an App-C update support module for communicating with the mobile communication device to receive a App-M version list installed at the mobile communication device, comparing the received App-M version list with a stored App-C version list corresponding to App-M, wherein if version-up of the App-C is needed, the App-C update support module communicates with an App-C providing server accessing the wire/wireless on-line network to receive an App-C of a new version, wherein the App-C update support module communicates with the car audio/video control module to update the App-C requiring version-up to the App-C of a new version.

* * * * *